No. 717,165. Patented Dec. 30, 1902.
I. B. CATLIN.
DEVICE FOR INFLATING TIRES OF VEHICLES.
(Application filed June 28, 1902.)
(No Model.)
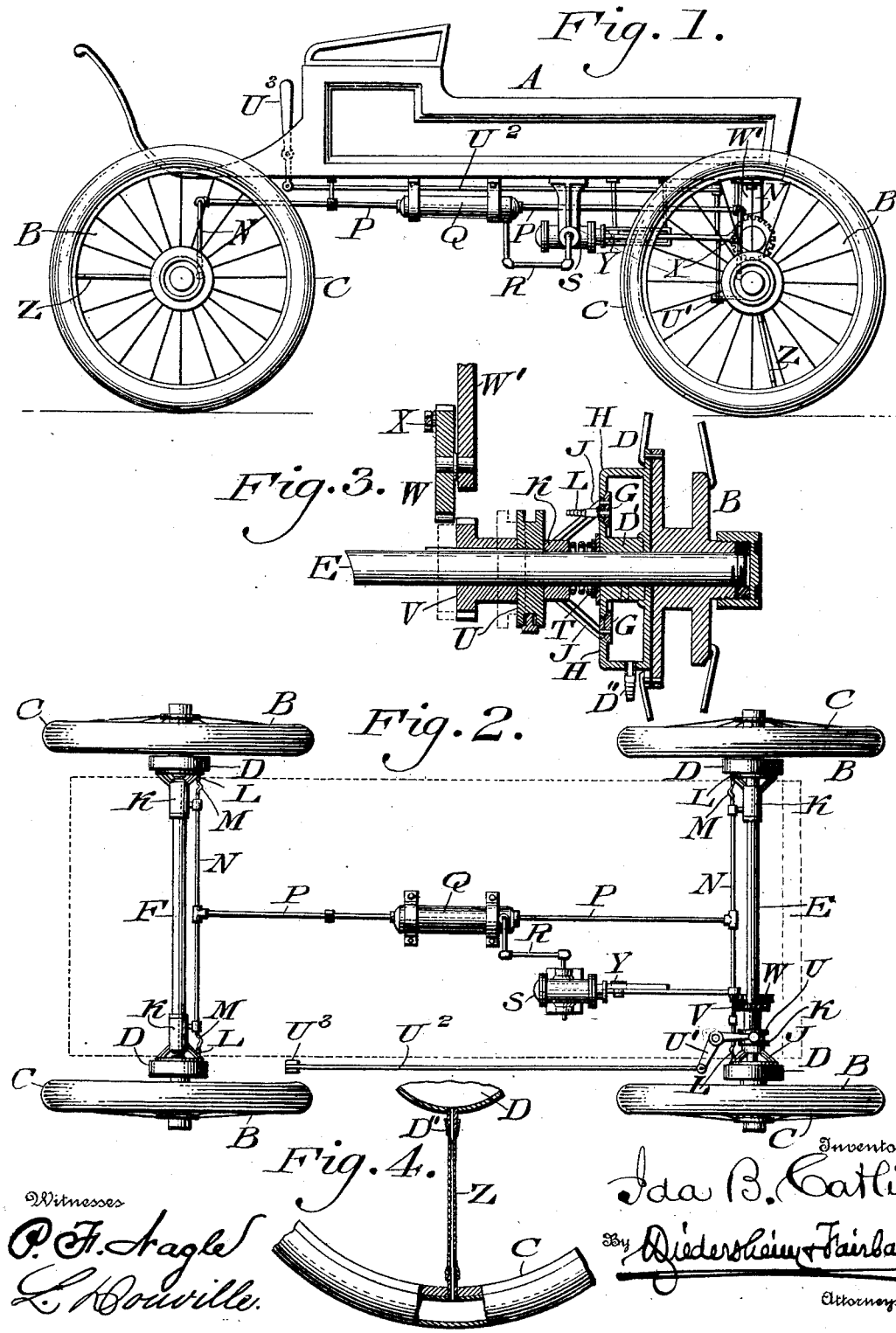

UNITED STATES PATENT OFFICE.

IDA B. CATLIN, OF PHILADELPHIA, PENNSYLVANIA.

DEVICE FOR INFLATING TIRES OF VEHICLES.

SPECIFICATION forming part of Letters Patent No. 717,165, dated December 30, 1902.

Application filed June 28, 1902. Serial No. 113,682. (No model.)

*To all whom it may concern:*

Be it known that I, IDA B. CATLIN, a citizen of the United States, residing in the city and county of Philadelphia, State of Pennsylvania, have invented new and useful Improvements in Devices for Inflating Tires of Vehicles, of which the following is a specification.

My invention consists of a device for inflating a tire of a vehicle while running, the same embodying an air-chamber which is connected with a wheel of said vehicle, a communication between said chamber and the tire, means for supplying said chamber with air, and means for stopping said supply.

Figure 1 represents a side elevation of a device for inflating the tires of a vehicle while running embodying my invention. Fig. 2 represents a bottom plan view thereof. Fig. 3 represents a section of a portion on an enlarged scale. Fig. 4 represents a partial side elevation and partial section of a portion of a tire and an air-conveying pipe leading from the air-chamber on the wheel to said tire.

Similar letters of reference indicate corresponding parts in the figures.

Referring to the drawings, A designates a vehicle; B, the wheels thereof, the latter having inflatable tires C. Secured to said wheels are the air chambers or boxes, as D, which are also mounted on the axles E F, respectively, which carry the wheels B and rotate therewith. The air-chambers consist each of a hollow body, one side of which is open and covered by the plate G, which is freely mounted on the adjacent rim or wall H of said body, so that as the latter rotates said plate may remain stationary. (See Fig. 3.) Connected with said plate are the arms J, which extend from the limb or collar K, the latter freely encircling the shaft E in said figure, it being noticed that each wheel has an air-chamber connected with it, two of the chambers being mounted on the axle E and two on the axle F. Extending from each plate G is the nipple L, to which is attached, by the pliable branch M, the air-conveying pipe N, which, by means of the pipes P, are connected with the air supply or receiver Q, to which latter is secured the pipe R, which leads to the pump S. The branches are flexible or pliable, as above stated, so that they may be readily fitted on and removed from the nipples L, and thus the stationary plates G may be conveniently reached for purposes of repairs, &c.

In order to hold the plate G air-tight on its seat in the rim H, there is interposed between the central collar D' of the air-chamber D and the collar K of the arms J the spring T, which presses said collar K from said collar D', and so forces said plate G against said rim, the contiguous faces of said rim and plate being beveled.

It will here be noted that the collars K, pipes N, P, and R, receiver Q, and pump S are connected with the body of the vehicle by hangers or other suitable means.

U designates a sleeve which is connected with the axle E so as to be rotated by the same and be capable of sliding thereon. To said sleeve is secured the pinion V, which, as is evident, follows the motions of the same.

W designates a pinion which is mounted on a hanger W' or other suitable bearing adjacent to the pinion V, so that when the clutch U is shifted the pinion V may be moved into engagement with the pinion W and afterward removed therefrom. On said pinion W is a wrist-pin X, which is connected with the piston-rod Y of the pump S. Connected with the air-chamber D is a nipple D'', to which is attached the tube Z, which leads to the tire C and forms a communication for said chamber with said tire.

The sleeve U is engaged by the elbow-lever U', to which is pivoted the rod U², the latter being connected with the hand-lever or treadle U³, which is in convenient reach of the operator of the vehicle.

The operation is as follows: When it is desired to inflate the tires, the sleeve U is operated, whereby the pinion V is shifted into engagement with the pinion W, thus giving motion to the piston-rod Y, consequently operating the air-pump S. This supplies the receiver Q, and the air is distributed through the pipes P N and branches M and nipples L, and as the latter are in communication with the air-chambers D through the plates G the air fills said chambers D and the same escapes through the nipples D'' and pipes Z into the tires C, thus inflating the latter. When this is accomplished, the sleeve is shifted in opposite direction, so as to restore it to its normal position, whereby the pinions E and V are thrown out of gear when the pinion W is at rest and the operation of the pump ceases, it being noticed that during the operation of the pump the air-chambers D rotate with the wheels of the vehicle and the plates G remain stationary, as hereinbefore set forth, it being also noticed that the pipes Z extend from the chambers to the tire C somewhat after the manner of spokes.

Having thus described my invention, what I claim as new, and desire to secure by Letters Patent, is—

1. In a device for inflating the tires of vehicle-wheels, a wheel, an annular chamber secured thereto and having an opening in its side, combined with a non-rotatable plate covering said opening, means for admitting air through the plate into the chamber, and means connecting the chamber with the inflatable tire.

2. In a device for inflating the tire of a vehicle-wheel, an air-chamber, fixed to and rotatable with said wheel, said wheel having an opening in its side, a stationary plate adapted to close said side, a pneumatic pump on the body of the vehicle, an air-distributing pipe leading from said pump, a nipple on said stationary plate and a flexible connection for said pipe and nipple.

3. In a device for inflating the tire of a vehicle-wheel, an air-chamber composed of a rotatable body having an opening in its wall, a stationary plate adapted to cover said opening, a collar connected with said plate and freely mounted on the axle of said wheel, a collar at the center of said body and a spring interposed between said collars whereby said stationary plate is held air-tight against the wall of the rotatable portion of the chamber.

4. In a device for inflating the tire of a vehicle-wheel, an air-chamber composed of a rotatable body having an opening in its wall, a stationary plate adapted to cover said opening, a collar connected with said plate and freely mounted on the axle of said wheel, a collar at the center of said body, a spring interposed between said collars whereby said stationary plate is held air-tight against the wall of the rotatable portion of the chamber, and a spring disconnected from said plate for holding the latter air-tight against the rotatable portion of the chamber.

5. In a device for inflating the tire of a vehicle-wheel, a wheel having an annular chamber secured thereto with an opening in its side, combined with a non-rotatable plate covering said opening, means for admitting air through the plate into the chamber, means for connecting the chamber with the inflatable tire, an air-pump, a sleeve feathered on said pump, a gear-wheel carried by said sleeve, a gear-wheel mounted on the vehicle and having connection with a piston-rod of said pump, and means connected with said sleeve for moving its gear-wheel to and from the gear-wheel on the vehicle.

6. In a device for inflating the tire of a vehicle-wheel, a wheel having an annular chamber secured thereto with an opening in its side, combined with a non-rotatable plate covering said opening, a spring disconnected from said plate for holding the latter air-tight against the wall of the rotatable portion of the chamber, means for admitting air through the plate into the chamber, means for connecting the chamber with the inflatable tire, an air-pump, a sleeve feathered on said pump, a gear-wheel carried by said sleeve, a gear-wheel mounted on the vehicle and having connection with a piston-rod of said pump, and means connected with said sleeve for moving its gear-wheel to and from the gear-wheel on the vehicle.

IDA B. CATLIN.

Witnesses:
JOHN A. WIEDERSHEIM,
C. D. McVAY.